(No Model.)
W. C. COLLYER.
Mechanism for Supporting a Gear Wheel.
No. 241,933. Patented May 24, 1881.
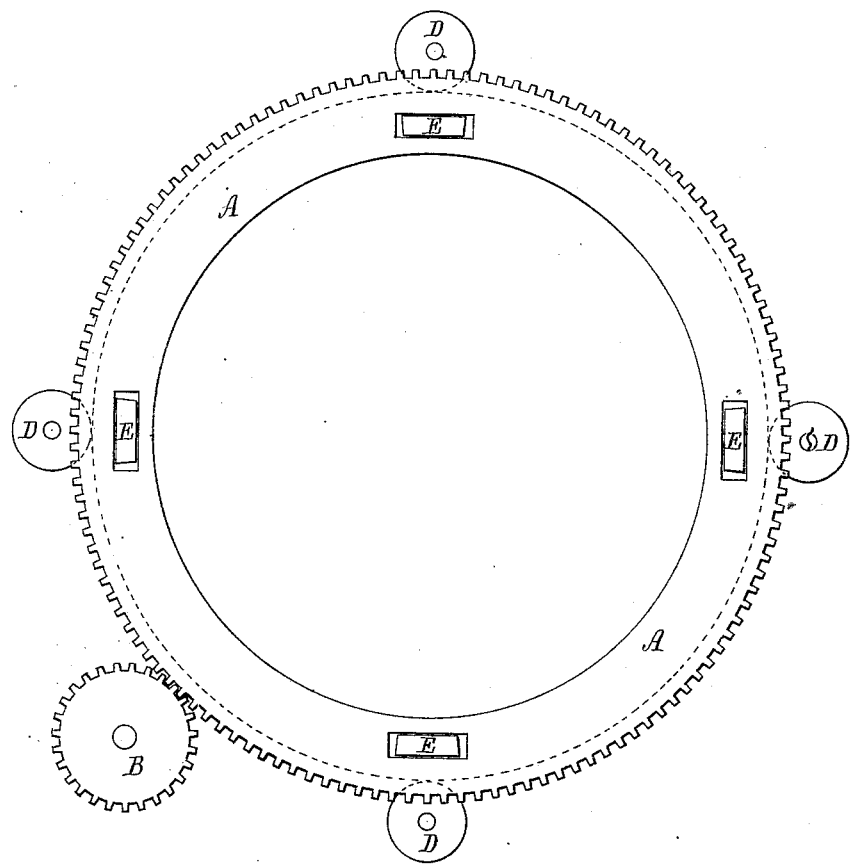
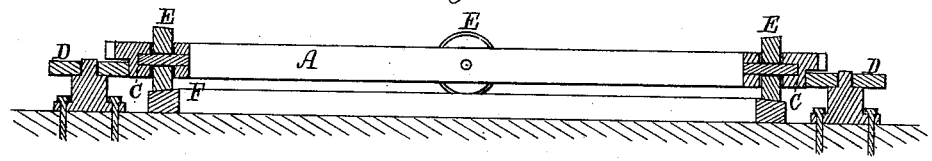
Witnesses.
S. N. Piper
E. P. ———
Inventor.
Wm. C. Collyer.
by R. H. Eddy, att'y

United States Patent Office.

WILLIAM C. COLLYER, OF LYNN, ASSIGNOR TO HIMSELF AND FREDERICK S. ANDREWS, OF GLOUCESTER, MASSACHUSETTS.

MECHANISM FOR SUPPORTING A GEAR-WHEEL.

SPECIFICATION forming part of Letters Patent No. 241,933, dated May 24, 1881.

Application filed April 2, 1881. (No model.)

*To all whom it may concern:*

Be it known that I, WILLIAM C. COLLYER, of Lynn, of the county of Essex and State of Massachusetts, have invented a new and useful Improvement in Mechanism for Supporting a Gear-Wheel; and I do hereby declare the same to be described in the following specification and represented in the accompanying drawings, of which—

Figure 1 is a top view, and Fig. 2 a transverse section, of a gear provided with my invention, the object of which is to do away with a central shaft or bearings to the gear, which in some cases would be in the way of a cam or other appliance or appliances to be added to or formed on the gear or its face.

The nature of my invention is duly set forth in the claim hereinafter made.

In the drawings, A denotes either an annular or a disk gear, having teeth on its periphery to engage with those of a driving-pinion, B. On one or its lower side the gear A has projecting from it a cylindrical shoulder or bearing, C, which at its circumference rests against a series of sustaining or friction wheels, D, disposed around it at equal distances apart, and duly supported, so as to revolve independently of one another. The gear A carries a series of bevel bearing-wheels, arranged in it at equal distances apart, each being adapted to revolve on its own axis, which is radial to the axis of the wheel A.

The wheels E bear or run on a circular and beveled track, F, arranged as shown.

On revolving the gear A it will be supported by its wheels E, track F, cylindrical shoulder C, and the friction-wheels D, the whole obviating the necessity of any shaft or central bearing to the said gear A.

In my mode of supporting the annular gear A laterally the cylindrical shoulder C and the wheels D are wholly outside of the gear, and consequently present no obstruction to the use of anything within the wheel.

I do not claim, therefore, an annulus-gear having supporting-wheels arranged within it and to bear against its inner periphery, and to be sustained by devices arranged across the wheel below it; nor do I claim an annulus-gear having its teeth on its inner circumference, and a rib to project from and around its outer circumference and extend into grooves of supporting-wheels, as shown in the United States Patent No. 23,280.

I claim—

The toothed annulus A, supported by wheels E and a circular track, F, and having its teeth on its outer circumference, to engage with a driving wheel or pinion, B, in combination with the cylindrical bearing-shoulder C and its sustaining-wheels D, arranged below and with respect to the teeth of said gear, substantially as set forth.

WILLIAM C. COLLYER.

Witnesses:
R. H. EDDY,
E. B. PRATT.